Dec. 4, 1962
B. W. KING
3,066,419
BARGE MEASURING INSTRUMENT
Filed June 3, 1958
2 Sheets-Sheet 1
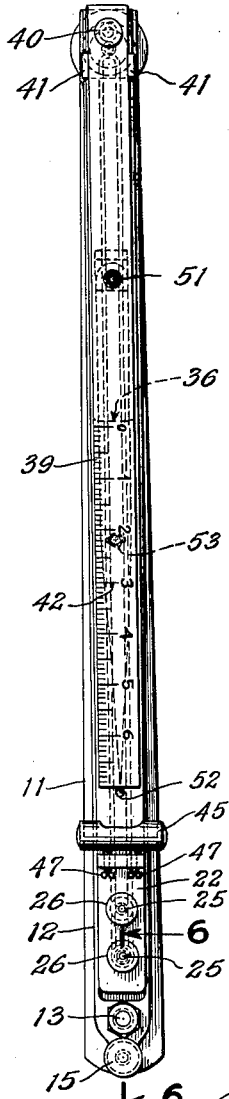
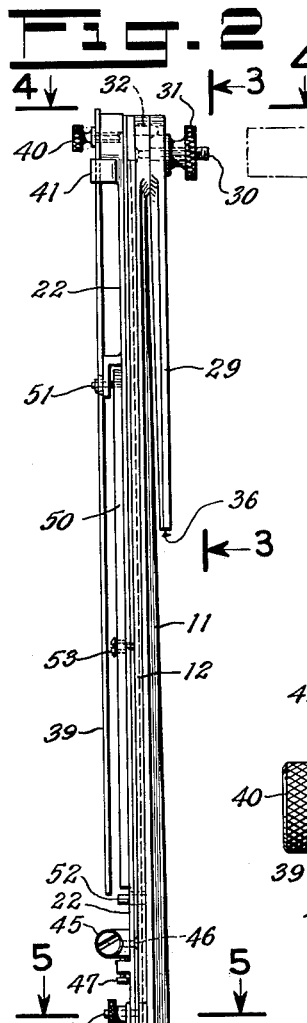
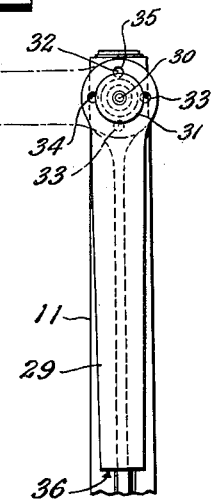
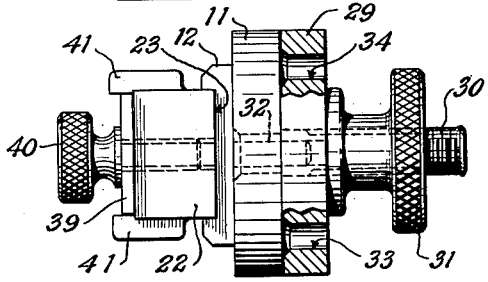
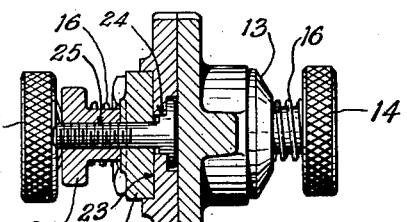
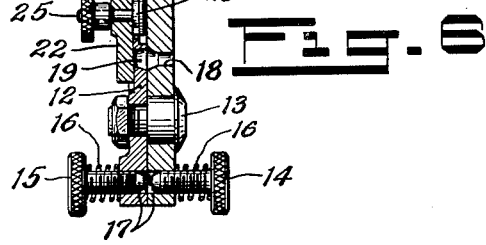
INVENTOR.
BERTELL W. KING
BY
*Bohleber, Fassett & Montstream*
ATTORNEYS Dec. 4, 1962 B. W. KING 3,066,419
BARGE MEASURING INSTRUMENT
Filed June 3, 1958 2 Sheets-Sheet 2
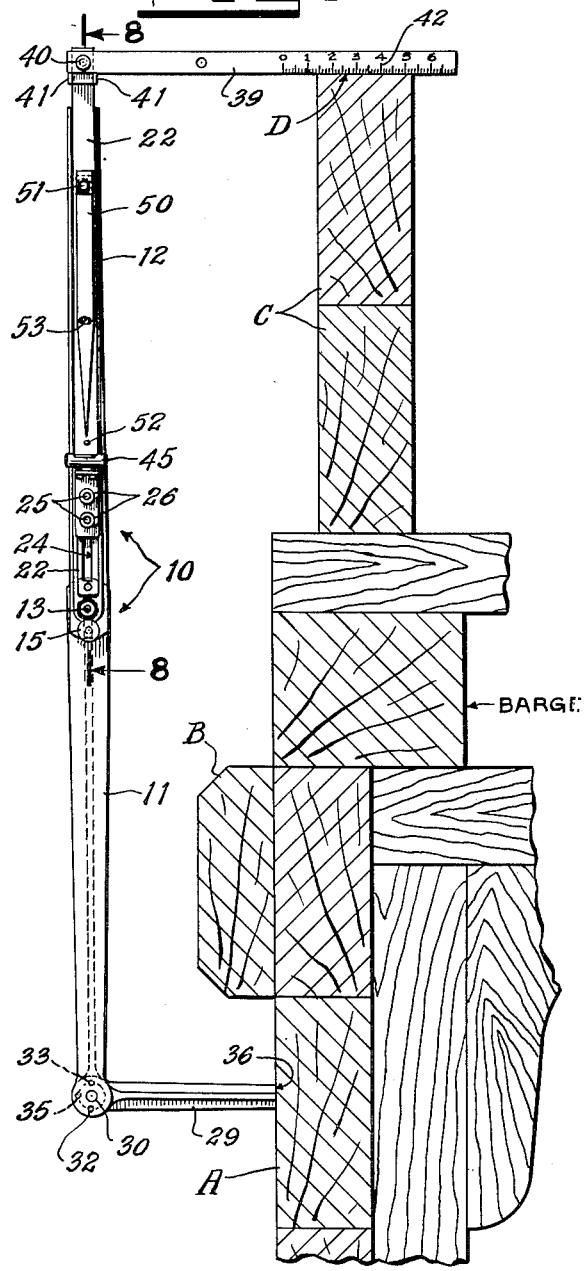
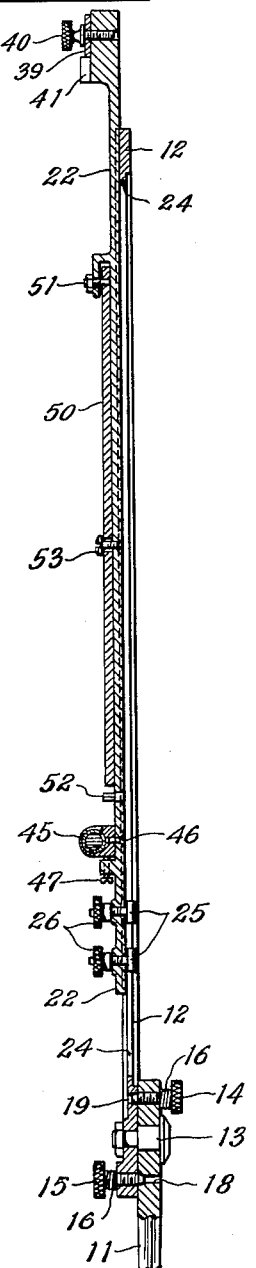
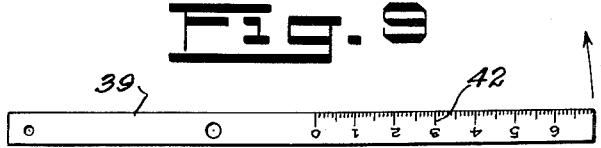
INVENTOR.
BERTELL W. KING
BY Bohleber, Fassett & Montstream
ATTORNEYS

United States Patent Office 3,066,419
Patented Dec. 4, 1962

3,066,419
BARGE MEASURING INSTRUMENT
Bertell W. King, 17 Battery Place, Brooklyn, N.Y.
Filed June 3, 1958, Ser. No. 739,617
4 Claims. (Cl. 33—125)

The invention relates to a measuring instrument for accurately measuring the horizontal distance of the outer surface of a vessel such as a barge from a location on the upper deck side wall. In determining the load carried by a barge the loaded displacement of the barge is calculated from accurate outside measurements taken of the barge. It is desired to know the dimensions of the barge from the outer surface A (FIG. 7) to the corresponding point on the outer surface of the barge on the opposite side or end. This cannot be measured with a tape measure because of the construction such as protruding stringers B, the raised side wall C and the inset of the side wall C. A first beam measurement can be taken with a tape measure using the side wall C taken either at the inner or outer edges of the side wall, or better still a mark may be made on the top surface D of the two side walls. This first or tape measure reading may be an even whole number of feet, for example 40 feet, to which is added the two other measurements, namely the distance between each mark or an edge of the side wall whichever is the reference point and the surface A on each side of the barge, using the instrument disclosed herein. Several or more of such measurements for length and width will or may be necessary.

It is an object of the invention to construct a measuring instrument having a measuring bar and an abutment bar adjustably mounted upon the main bar means so that each can be adjusted to extend to one side or the other for accurate measurement.

Another object of the invention is to construct a measuring instrument in which the measuring bar and the abutment bar can be adjusted also to overlapping alignment with the main bar means whereby the instrument can be reduced to a very narrow bar relatively for easy portability.

A still further object of the invention is to construct a measuring instrument in which the main bar means comprises a pair of arms which are pivotally mounted together so that the two arms may be adjusted to overlapping alignment and thereby reducing the overall length of the instrument by about one half thereby reducing the effective length of the instrument when folded together for portability.

Other objects of the invention will be more apparent from the following description when taken in connection with the accompanying drawings illustrating a preferred embodiment thereof in which:

FIG. 1 is a plan view of the instrument folded together;
FIG. 2 is a side view of the folded instrument;
FIG. 3 is a partial view of the instrument with the abutment arm in folded alignment and extended laterally in dot-dash lines and showing its adjustability into three positions;
FIG. 4 is an enlarged end view of the instrument with a part in section taken on line 4—4 of FIG. 2;
FIG. 5 is a cross section taken on line 5—5 of FIG. 2;
FIG. 6 is a partial longitudinal section through the pivot means for the arms taken on line 6—6 of FIG. 1;
FIG. 7 is a view of the instrument as it will be used on a barge;
FIG. 8 is a longitudinal enlarged section of one arm of the instrument and the arm pivot means taken on line 8—8 of FIG. 7; and
FIG. 9 is a plan view of the other side of the measuring bar showing the scale inverted with respect to that of FIG. 7.

The instrument includes a main bar means 10 which preferably includes an arm 11 and an arm 12 which are connected together at an end of each arm by suitable means which enables them to be assembled in overlapping relation to shorten its length when carrying the same. The connecting means shown is a suitable connecting pivot means 13. The pivot means permits the arms to be folded together in overlapping alignment without separation of the arms, thereby permitting the instrument to be shortened to about half its length for ease in carrying. Aligning means are provided to retain the two arms in extended position. The means shown includes at least one locating screw although two locating screws 14 and 15 are shown. One screw is threaded into each of the arms at a point spaced from the pivot center. A spring 16 may be used around the screws. The screws are threaded into a hole 17 in each arm. The end of the locating screw 15 may be readily advanced to engage a locating hole 18 in arm 11 and a similar locating hole 19 is provided in arm 12 for screw 14. Preferably these holes are tapered to receive a taper end on the locating screw. When the arms are in extended aligned position the locating screw 14 will be in alignment with the locating hole 19 and upon being threaded thereinto the two bars will be locked in fixed extended position. At the same time the locating screw 15 will be opposite, and may be projected into, its locking hole 18 to give double assurance that the two arms are extended in a straight line. In folded position one screw 15 may be retracted within its hole 17 and the other screw 14 may be threaded into this hole to retain the two arms in folded relationship.

Since the distance from the top of the side wall C and the outer surface A of the barge will vary in different barges the main bar means is extensible. To this end one of the arms carries an extensible member 22. The upper arm 12 is shown as carrying this member. A suitable adjusting connection is used; that shown includes a groove 23 in the arm which receives the extensible member. The arm also has a slot 24 in which is received a pair of spaced clamping screws 25 each of which passes through a hole in the extensible member and receives a clamping nut 26. The extensible member may be adjusted or extended to any position on the arm 12 and clamped in extended position.

The lower arm 11 has an abutment arm 29 adjustably mounted on the end of the arm and hence on the end of the main bar means so that it can be adjusted to extend laterally on either side thereof. The means which is illustrative includes a pivot 30 such as a screw on which is received a nut 31 to clamp the abutment arm in adjusted position. Suitable locating means is included which is shown as a pin 32 (FIG. 2) carried by arm 11 the end of which is received in the hole 33 for extension on one side of the main bar means or the hole 34 for extension on the other side. Preferably a hole 35 is also provided so that the abutment bar may be moved to overlapping alignment with the main bar means for compactness and easy portability. The abutment arm has an abutment end 36 which engages the surface A on the barge.

The other end of the main bar means carries a measuring bar 39 which is adjustably mounted on this means by suitable means. The measuring bar is shown as pivotally supported thereon by a pivot such as pivot screw 40 which is threaded into the end of the main bar means. The measuring bar is adjustable to extend to and be retained laterally on either side of the main bar means. The locating means shown is projecting means 41 carried by the main bar means or particularly the extension 22. This projecting means is located so that when the measuring bar extends in one lateral direction, one edge surface engages the edges of the projecting means and when the bar is extended in the other lateral or opposite direction the other edge of the bar engages the projecting means. Preferably the projecting means is a pair of spaced projections spaced apart to receive the measuring bar therebetween so that the measuring bar can also be positioned in overlapping alignment with the main bar means which reduces the instrument to a relatively small lateral dimension for easy portability. The measuring bar has a scale 42 thereon shown as one inch main indicia and subdivisional tenths of an inch indicia. The zero indicium is located so that it is in vertical alignment with the abutment end 36 of the abutment bar when it is extended as described below.

In order to assure that a proper measurement is made the main bar means carries a liquid level 45 mounted in a horizontal position and so that it reads upwardly. The level is secured thereto in any suitable manner such as by screw 46, and adjusting screws 47 may be used to adjust the level or horizontal position of the level when necessary.

For more precise determination of the vertical position of the measuring instrument, a pointer 50 may be pivotally carried on a pivot 51 carried by the main bar means or particularly the extensible member, which pointer may be aligned with a marker 52 when the instrument is in vertical alignment or plumb. A stop 53 may limit the pivotal movement.

In determining the barge outside dimensions, a tape measure is used to get a first measurement using one of the edges of the side wall C or putting a mark on the upper surface D of opposite side walls. The horizontal dimension from the surface A to the tape mark is secured with the instrument. The abutment bar 29 is adjusted to an outwardly extending position and the measuring bar 39 is adjusted to extend outwardly at right angles in the same direction. The end of the abutment bar is placed in contact with the surface A of the barge and the level 45 or the pointer 50 are sighted until the main bar means is in vertical position whereupon the scale on the measuring bar is read at the tape measure mark or the edge of the side wall whichever was used in making the tape measurement. This scale reading provides a second measurement. The abutment bar 29 is now turned around or adjusted to extend laterally in the opposite direction and the measuring bar 39 is similarly turned around to extend laterally in the other direction and the same measurement is taken with the instrument on the other side of the barge which provides a third measurement. Adding these three measurements together gives the barge measurement.

The reason for turning these two bars to the opposite side of the main bar means is to ensure accuracy in the measurement. It may be that the level or pointer has lost its adjustment by being bumped or inaccurately set. If this is true, the instrument without the adjustment of the abutment bar and measuring bar would add an error twice, or once for each of the two measurements made, or subtract an error on each side of the barge, depending upon whether the misadjustment slanted the main bar means outwardly or inwardly. However by reversing these two bars any error in the adjustment of the level cancels out because one error would be additive and the other subtractive or vice versa. In addition to any misadjustment of the level or pointer, the means for securing the two arms of the main bar means in alignment may get out of adjustment through wear or abuse so that any error in the adjustment of the extended arms, any misalignment in the extensible member 50, any bend in the main bar means and other misadjustments will cancel out in the same way. With this measuring instrument therefore, an accurate measurement can be secured of the two additional measurements which are added to the tape measurement to secure the dimension of the vessel or barge between the surfaces A on opposite sides thereof.

This invention is presented to fill a need for improvements in a Barge Measuring Instrument. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A barge measuring instrument comprising a vertical main bar means of substantial length and having upper and lower ends, an abutment bar having an inner end and an outer end, means mounting the inner end of the abutment bar on the lower end of the main bar means for fixed extension laterally on either side thereof and solely at right angles with respect to the main bar, a measuring bar of substantially greater length than the abutment bar and having an inner end and an outer end, means mounting the inner end of the measuring bar on the upper end of the main bar means for fixed extension laterally on either side thereof solely at right angles to the main bar means, a scale carried by the measuring bar beginning at a point in vertical alignment with the outer end of the abutment bar and extending towards the outer end of the measuring bar, and a level secured to the main bar means in horizontal position for indicating the vertical position of the main bar means.

2. A barge measuring instrument as in claim 1 in which the mounting means for the abutment bar also mounts the bar for overlapping alignment with the main bar means, and in which the mounting means for the measuring bar also mounts the bar for overlapping alignment with the main bar means, and in which the main bar means includes a pair of arms of approximately equal length, means pivotally mounting an end of one arm to an end of the other arm, and means securing the arms solely in extended alignment.

3. A barge measuring instrument as in claim 1 in which the main bar means includes a main bar, and an extensible member, means mounting the extensible member for sliding movement and clamping on the main bar means, and the measuring bar being carried on the extensible member.

4. A barge measuring instrument as in claim 1 in which the main bar means includes a pair of arms of approximately the same length each arm having an end, means pivotally mounting the ends of the arms together and means locking the arms together in folded position and solely in extended aligned position.

References Cited in the file of this patent

UNITED STATES PATENTS

| | | |
|---|---|---|
| 13,651 | Adair | Oct. 16, 1884 |
| 413,930 | Driscoll | Oct. 29, 1889 |
| 1,051,877 | Du Mouchel | Jan. 30, 1912 |
| 1,860,184 | Jacobs | May 24, 1932 |
| 2,021,202 | Sauer | Nov. 19, 1935 |
| 2,063,922 | Greenberg | Dec. 15, 1936 |

FOREIGN PATENTS

| | | |
|---|---|---|
| 58,830 | Austria | Apr. 25, 1913 |